June 1, 1954      F. B. CARNEY      2,679,791

DISK PLOW AND MOUNTING THEREFOR

Filed Aug. 24, 1949      5 Sheets-Sheet 1

INVENTOR
FLETCHER B. CARNEY
By Toulmin & Toulmin
ATTORNEYS

June 1, 1954  F. B. CARNEY  2,679,791
DISK PLOW AND MOUNTING THEREFOR
Filed Aug. 24, 1949  5 Sheets-Sheet 2
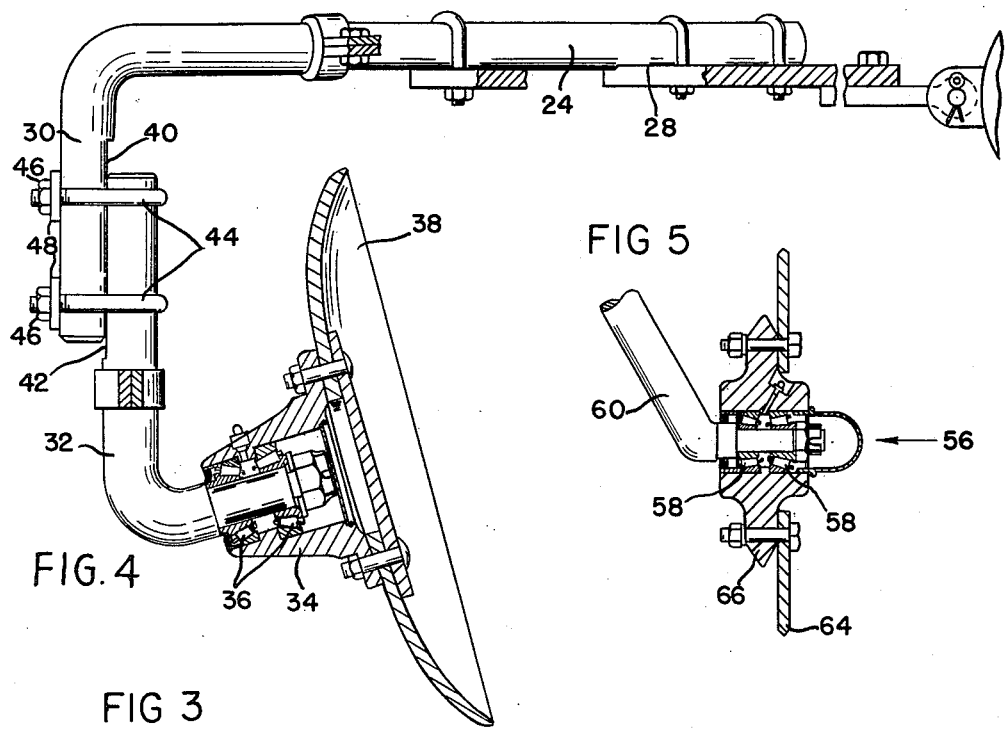
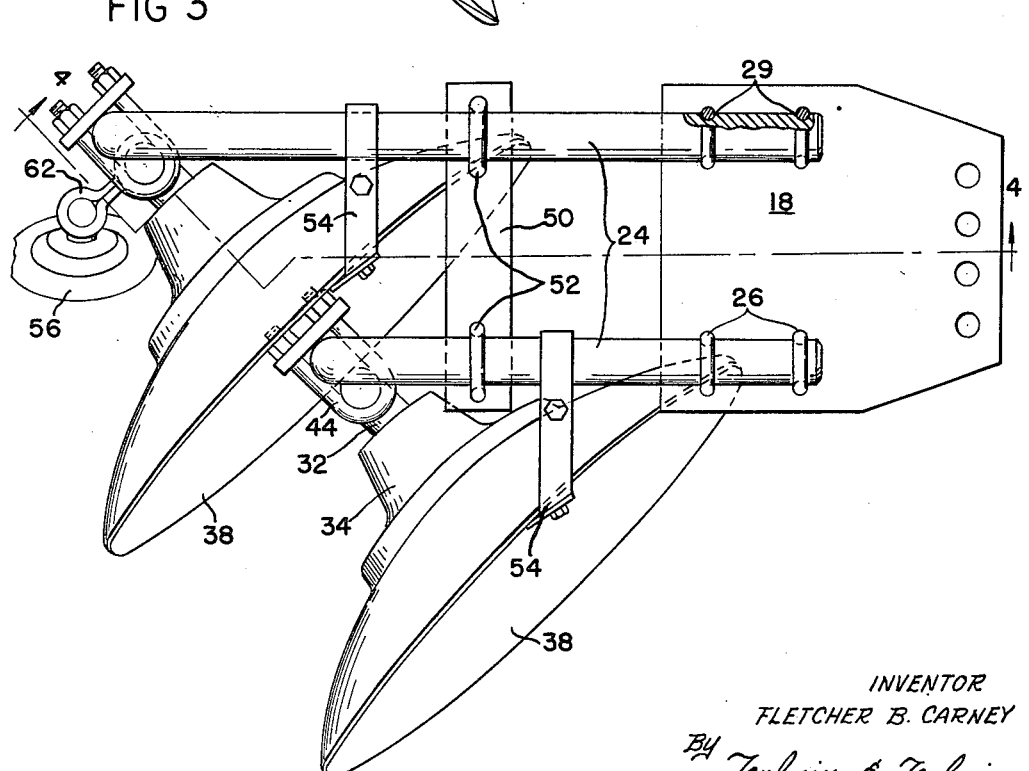
INVENTOR
FLETCHER B. CARNEY
BY Toulmin & Toulmin
ATTORNEYS.

June 1, 1954     F. B. CARNEY     2,679,791
DISK PLOW AND MOUNTING THEREFOR
Filed Aug. 24, 1949     5 Sheets-Sheet 3
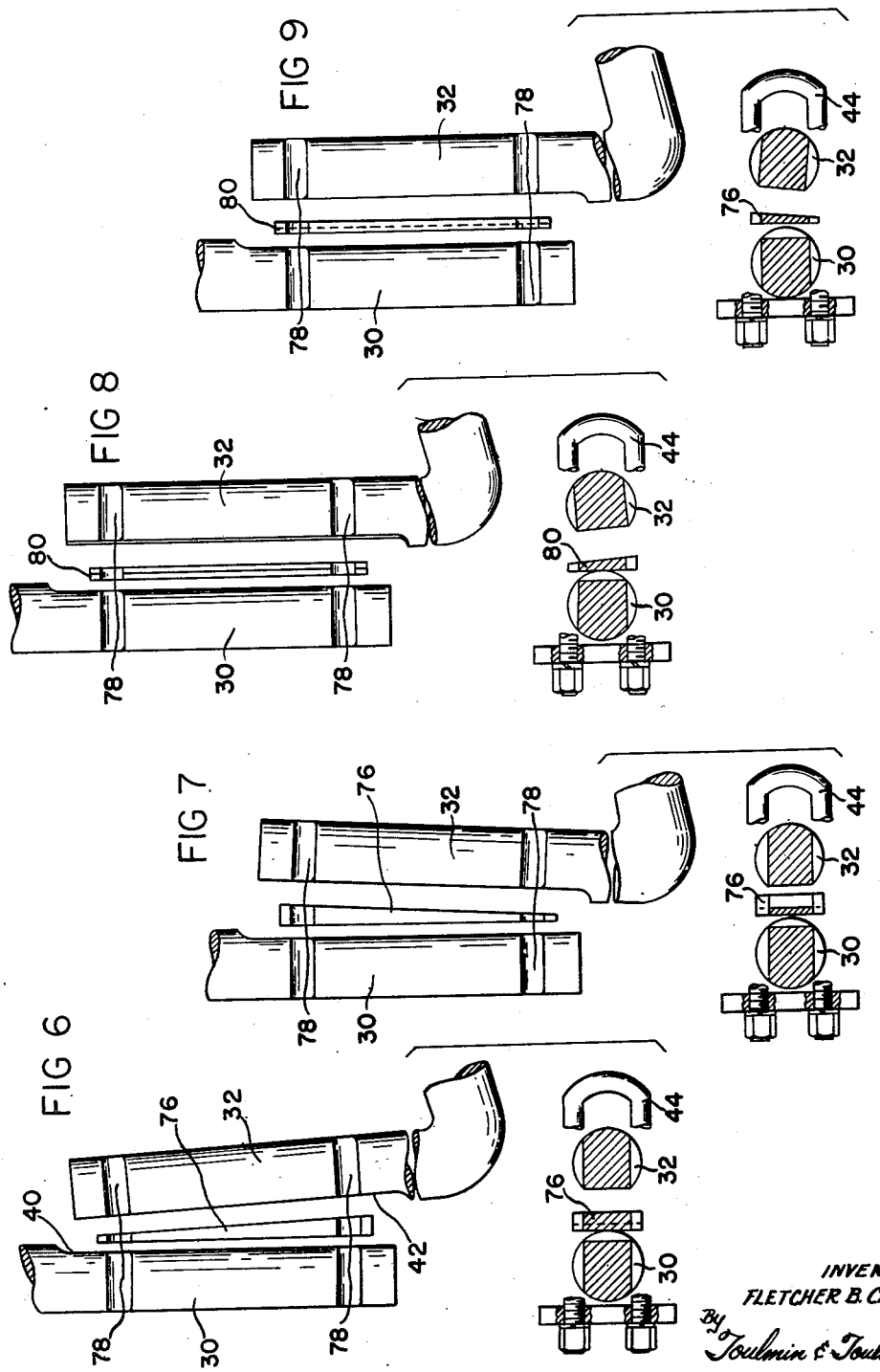
INVENTOR
FLETCHER B. CARNEY
By Toulmin & Toulmin
ATTORNEYS

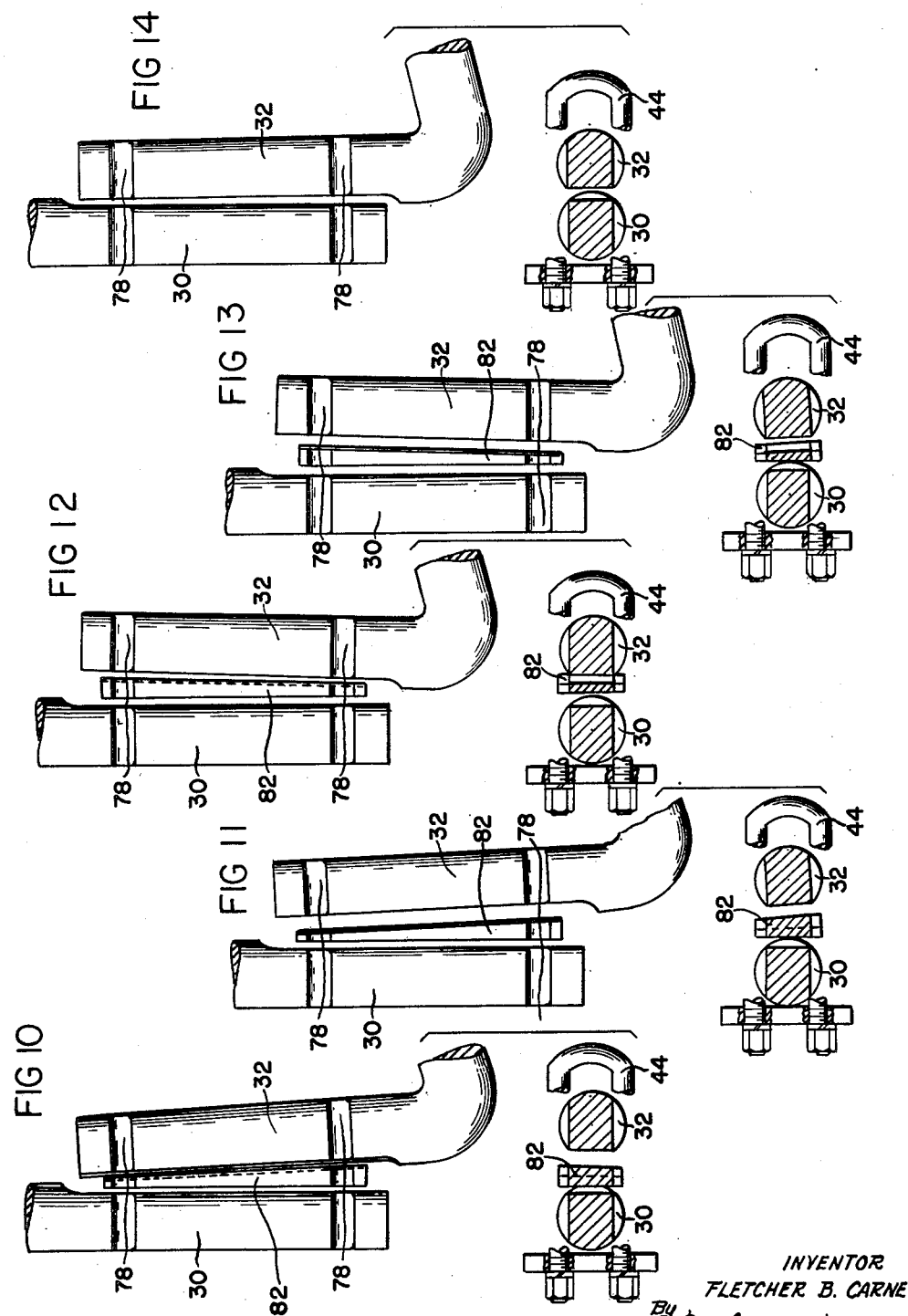

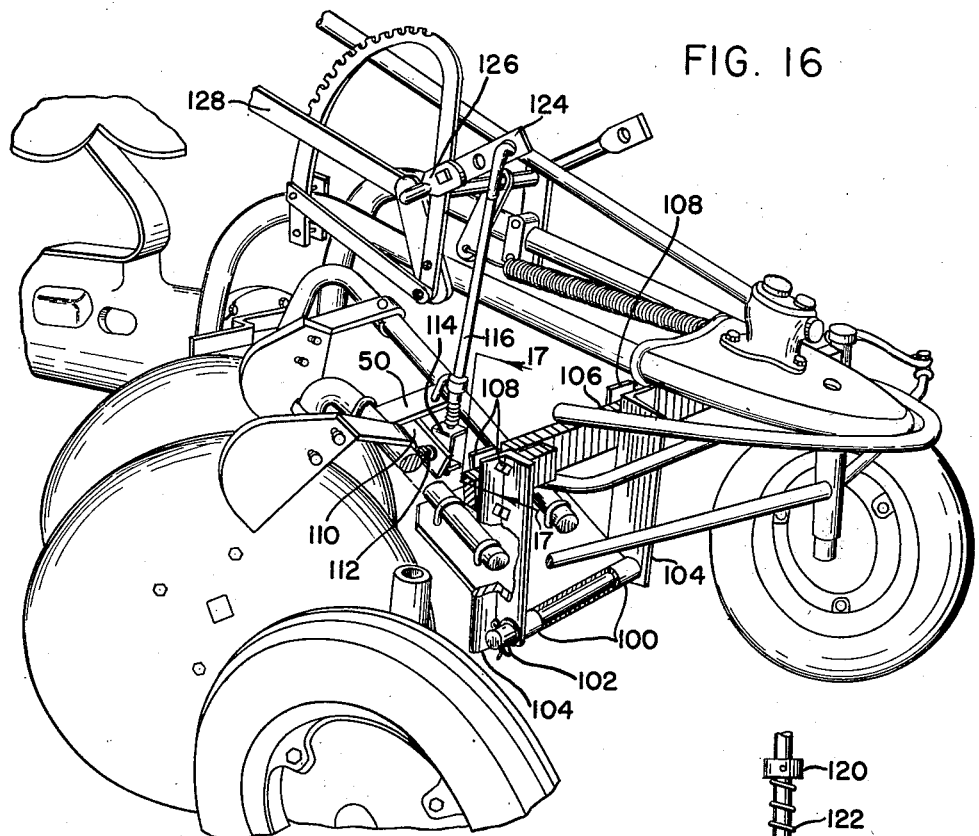
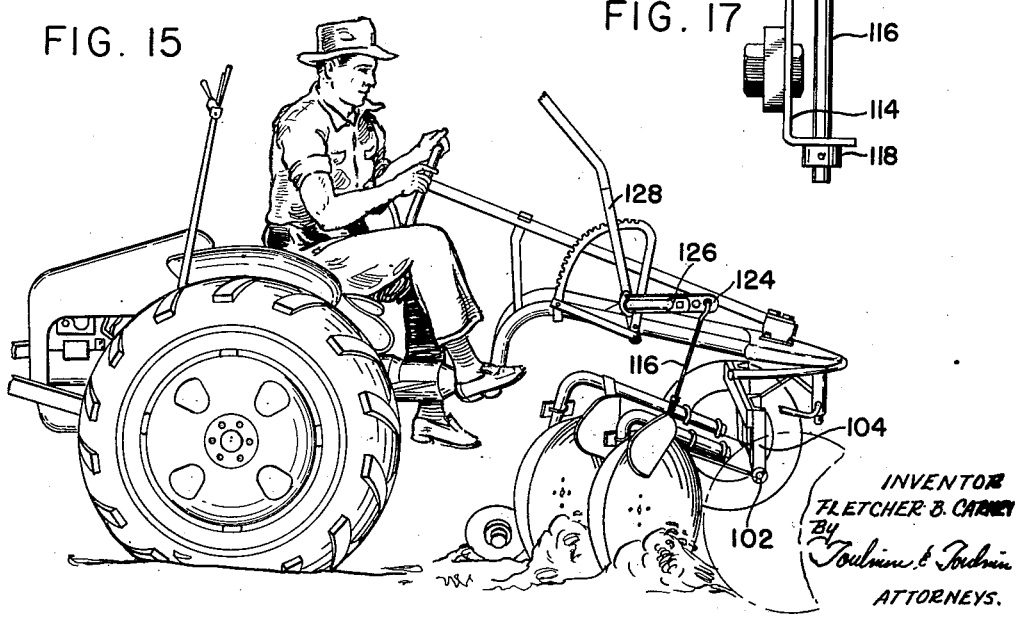

Patented June 1, 1954

2,679,791

UNITED STATES PATENT OFFICE 2,679,791

DISK PLOW AND MOUNTING THEREFOR

Fletcher B. Carney, Mountain Brook, Ohio

Application August 24, 1949, Serial No. 112,085

3 Claims. (Cl. 97—47.37)

This invention relates to disc plows and to mountings therefor, and particularly to tractor mounted disc plows.

Disc plows of the type with which this invention is concerned comprise one or more discs mounted on a frame which supports them at an angle to the ground to be worked, such that as the plows are drawn through the ground, the disc or discs will turn furrows in the ground.

With plows of this nature, it has been found that different types of soil require different settings of the discs in order to obtain the best results. For example, in a light, sandy soil, one disc angle will produce a satisfactory furrow, whereas, in heavy clay soil, the same disc angle might be highly unsatisfactory. This is due to the fact that the soil offers different degrees of resistance to the plowing discs and exerts different thrusts thereon, so that substantially different results are obtained as soil conditions change.

It has been found that by adjusting the disc angles properly, the plow will be of the self-energizing type and dig into the soil automatically as it is drawn over the ground. This tendency for the plow to dig into the ground is very useful, but it is necessary to effect a control thereover to regulate the depth of furrow being turned and also to prevent the plow from drifting laterally in operation.

The primary object of the instant invention is to provide an improved plow arrangement in which the above-mentioned adjustability of the plowing discs is very simply accomplished.

Another object is to provide an arrangement for adjusting the discs in a disc plow to a plurality of angles and without the use of levers, gears, ratchets, and similar mechanisms often employed in connection with farm machinery.

It is also an object to provide for permitting multiple adjustments for the discs of a disc plow such that the support for the discs is always rigid and is not in any way weakened by the adjustability feature.

A still further object is to provide an improved disc plow arrangement especially adapted for tractor mounting, either side or rear.

A still further object is the provision in combination with a disc plow of the self-energizing type of a regulating or coulter wheel which will regulate the depth the plowing discs will enter the ground and will also operate to absorb side thrusts on the discs to prevent the plow from drifting laterally in use.

It is a particular object of this invention to provide anti-friction bearings for the discs and regulating wheel of a disc plow whereby a minimum of draft will be required for drawing the plow through the ground, and whereby the plowing discs will turn readily for turning the earth over and breaking it up.

These and other objects and advantages will become more apparent upon reference to the following description taken in connection with the accompanying drawings in which:

Figure 3 is a plan view looking down on top of the disc plow mechanism proper, as shown in Figure 2;

Figure 4 is a vertical section indicated by line 4—4 on Figure 3;

Figure 5 is a vertical section taken through the regulating wheel;

Figures 6 and 7 are views showing one form of adjustment plate which can be used for adjusting the angle of the discs;

Figures 8 and 9 are similar views showing another form of adjustment plate;

Figures 10 through 13 are similar views showing still another adjustment plate;

Figure 14 is a view showing how the discs can be supported on the frame of the plow without the use of any adjustment plates;

Figure 15 is a view showing the plow mounted on another type of tractor;

Figure 16 is a perspective view of the front end of the tractor of Figure 15 showing how the plow is mounted thereon; and Figure 17 is a sectional view indicated by line 17—17 on Figure 16.

Figure 1:
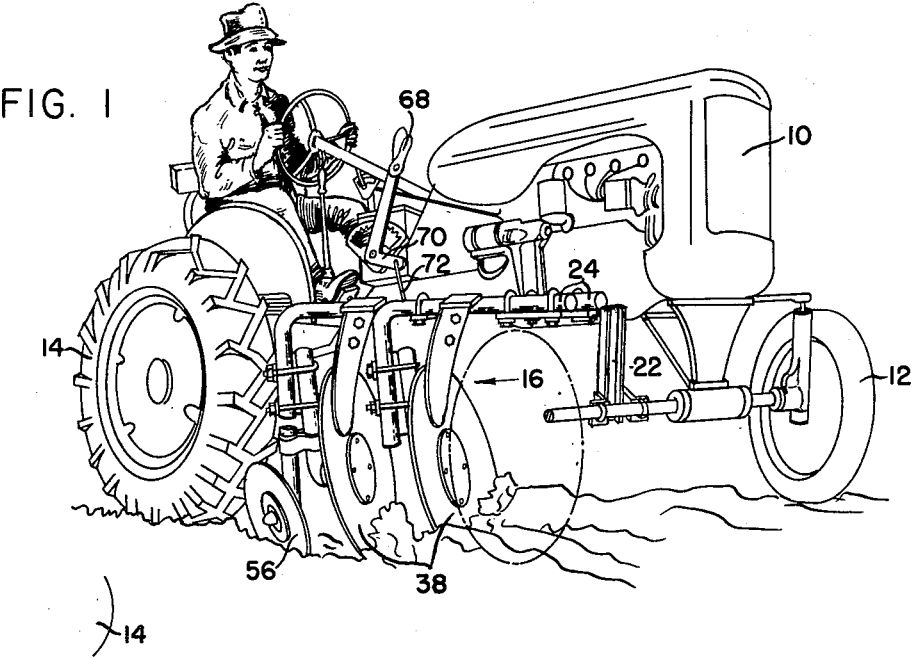
Figure 1 is a perspective view showing a disc plow according to my invention side mounted on a tractor.

Referring now to the drawings, Figures 1 through 4 show a disc plow arrangement somewhat similar to that illustrated in my co-pending application, Serial No. 49,897, filed September 18, 1948, now Patent No. 2,617,344, and of which application the instant application is a further inventive extension.

Figure 2:
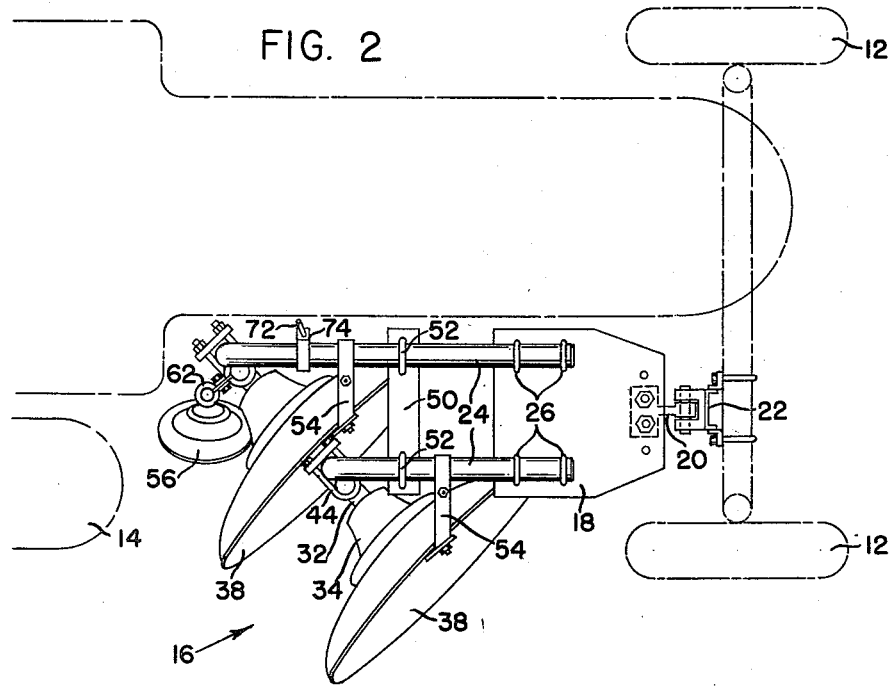
Figure 2 is a plan view looking down on the device of Figure 1.

In the drawings, Figures 1 and 2 show a tractor 10 having front wheels 12 and rear wheels 14. At the one side of the tractor is the disc plow of this invention, generally indicated at 16. The disc plow comprises a frame terminating at its forward end in attachment plate 18, and which is secured by means of the pivot bracket 20 to a supporting frame 22 secured to the front axle of the tractor inside the front wheels.

Plate 18 has secured thereto in laterally spaced relationship and extending rearwardly therefrom, a pair of beams 24, which may be clamped to the plate by U-bolts 26. In order to prevent beams 24 from turning on their axes relative to plate 18, they may be flattened at their bottom sides, as indicated at 28 in Figure 4. Also, the beams are notched to receive the legs of the U-bolts, whereby draft is transmitted from plate 18 to the beams 24. Further, to transmit draft from plate 18 to the beam, the beams may be notched at 29 to receive the U-bolts that clamp the beams to the plate.

The beams 24 extend rearwardly from plate 18 and have their rear ends turned downwardly, as will best be seen at 30 in Figure 4. The beam 24 farthest from the tractor is shorter than the beam 24 near to the tractor, as can be seen in Figures 2 and 3. At the ends of beam 24 are the disc supporting arms 32, and each of the arms 32 has its lower end turned to an acute angle relative to the upper part and to form a dead axle that supports thereon a disc hub 34 by means of the multiple anti-friction bearings 36, which are preferably of the adjustable tapered roller bearing type, as shown.

Each disc hub detachably mounts thereon a plowing disc 38. The discs 38 may be of any well-known type and are preferably of a substantial size and with rather sharp peripheries, so as readily to dig into the ground to be plowed. The down-turned parts 30 of the beams 24 and the upper parts of the arms 32 are flattened, as indicated at 40 and 42, and are clamped together by the U-bolts 44, having the nuts 46 and the plates 48. It will be evident that the flattened portions 40 and 42 and the clamping arrangement for maintaining these parts in face engagement provide for positive keying of the plowing discs at predetermined angles relative to the frame of the plow.

In Figures 2 and 3, it will be noted that the arms 24 are braced in their proper relative positions by a brace plate 50 extending therebetween remote from plate 18 and to which the said beams 24 are rigidly clamped by the U-bolts 52. It will also be noted that each of the beams 24 preferably includes a scraper 54 secured thereto and extending over the face of the adjacent disc and maintaining it free of soil.

Figures 2 and 3 will also serve to reveal that the axes of the plowing discs are substantially co-planar, so that the disc arrangement is staggered with the trailing disc being positioned to turn a furrow adjacent to that turned by the first disc, but in a manner so as not to interfere with the operation of the first disc. It will be apparent that as few or as many plowing discs can be employed as desired, the usual number being one, two or three.

As previously mentioned, the plow of this invention is self-energizing, and when placed on the ground and drawn thereover, will dig into the soil automatically and commence plowing. Due to the self-energizing nature of the plow, it is highly desirable to provide for a regulating or coulter wheel 56 which is mounted on anti-friction bearings 58 on the end of an arm 60 which is adapted for being adjustably clamped to arm 32 of the rear plowing disc, as by means of the clamp 62. The coulter or regulating wheel includes a flat disc part 64 bolted to the hub 66 that encloses bearings 58, and this flat disc part is positioned to bear against the side and bottom of the furrow being formed by the rear plowing disc so as to provide a stop that limits the extent that the plow digs into the soil, and also to provide an abutment which prevents the plow from drifting laterally due to the thrust of the soil thereon.

Inasmuch as the regulating or coulter wheel is mounted on anti-friction bearings, it offers substantially no resistance to drawing the plow through the ground, but rather, rolls freely in the furrow as explained above.

Returning for the moment to Figures 1 and 2, it will be noted that in Figure 1 the tractor 10 includes an adjustable lever 68, and an outwardly extending part 70 of this lever is connected by a link 72 with the frame of the plow, as indicated at 74 in Figure 2. It is pointed out that the connection of the link 72 with the frame at 74 is preferably of the resilient type as illustrated in Figure 17, and utilized as disclosed in Figures 15 and 16. Lever 68 provides a means for lifting the plow from the ground for transport or for lowering the plow onto the ground for plowing. It will be apparent that the arrangement illustrated is at once very effective and convenient. It will also be evident that additional means for absorbing side thrusts on the plow could be provided in the form of a compression member extending from the frame of the plow to the frame of the tractor and pivoted to both thereof in order to permit free movement of the plow frame in a vertical plane so it could be lowered to the ground and raised therefrom.

It has been mentioned before that different types of soils require the plowing discs to be adjusted to different angles in order to obtain the best results. It has been seen that the beams 24 and the disk supporting arms 32 are so arranged that the discs are presented to the ground at a predetermined compound angle that is effective for ordinary soils. However, when the soils become very light or very heavy, or virgin soils are to be turned, means are provided for varying the angle between the upper part of arm 32 and the down-turned part 30 of the beam 24 pertaining to the said arm. This means takes the form of tapered plates which are shown in Figures 6 through 14. Referring first to Figure 6, it will be noted that there is provided a plate 76 which is rectangular in cross-section, but which tapers from end to end. The wedge plate has an included angle between its opposite faces of three degrees, and when placed between parts 30 and 32, as shown, increases the vertical angle of the disc relative to the ground in the amount of three degrees.

When plate 76 is inverted, as shown in Figure 7, it has an equivalent but opposite effect on the disc angle, reducing it by three degrees. In each case, the angle of attack of the disc measured in the horizontal plane is not changed, but remains the same as when parts 30 and 32 are directly secured together.

It will be noted in Figures 6 through 14 that parts 30 and 32 and the wedge parts are all grooved, as at 78, for receiving the U-bolts 44, so that the mere assembling of the parts together with the U-bolts is sufficient for predetermining the positions of the discs relative to the plow frame in the vertical direction.

Turning now to Figures 8 and 9, the wedge plate 80 illustrated therein is rectangular in vertical cross-section but is wedge-shaped in plan, so that when it is placed between parts 30 and 32 it does not influence the vertical angle of the disc relative to the ground but does change its angle in a horizontal plane. The plate 80 illustrated in the drawings has an included angle of four degrees between its opposite faces, and thus is effective for increasing the horizontal angle of the disc by four degrees, as shown in Figure 8 or for reducing the said angle by four degrees, as shown in Figure 9.

Figures 10 through 14 illustrate still another wedge plate, and this plate, indicated at 82, is wedge-shaped in both transverse and longitudinal cross-section. The included angle between the opposite vertical faces of wedge plate 82 is two and one half degrees, and the included angle between the faces looking down on the wedge plate is three degrees. Thus with the plate placed between parts 30 and 32, as shown in Figure 10, the vertical angle of the disc is increased by two and one-half degrees, and the horizontal angle is increased by three degrees.

In Figure 11, the plate is reversed about a vertical axis, and this gives an increase in the vertical angle of the disc by two and one-half degrees and a decrease in the horizontal angle by three degrees.

In Figure 12, the wedge plate has been inverted from its Figure 10 position, and this gives a decrease of two and one-half degrees in the vertical angle of the disc and an increase of three to three and one-half degrees in its horizontal angle.

In Figure 13, the wedge plate is inverted from its Figure 11 position, and this gives a decrease of two and one-half degrees in the vertical angle of the disc and an increase of three and one-half degrees in its horizontal angle.

In Figure 14 the parts 30 and 32 are shown as they appear when about to be clamped together with no wedge plate therebetween, and under these circumstances, there is no variation in either the vertical or horizontal angle of the disc from that provided for by location of the flats 40 and 42 of the parts 30 and 32 and the angularity of the lower part of arm 32 in relation to its upper part.

It will readily be seen that whereas there have only been illustrated three different types of wedge plates, there could be as many of these provided as desired to effect as many different adjustments of the discs as necessary to accommodate the plow to different types of soils, or a pair or more could be used at one time to give the desired disc angle. In any case, the wedge plates can readily be installed in a few minutes and without the exercise of any skill, and when the U-bolt clamps 44 are tightened, the plow is fully as rigid with the wedge plates included as it is without them.

The wedge plates are relatively inexpensive, are easy to store, and represent no source of trouble, because it is impossible for them to get out of adjustment or be bent or damaged in any way whatsoever.

It will also be evident that while the plow of this invention has been illustrated as a side mounted addition to a tractor, it could also be a rear mounted unit, and fully equivalent results would obtain. With either mounting, the regulating or coulter wheel is effective for eliminating side draft and for regulating the depth of the furrow which the plow makes. This, in combination with the complete and ready adjustability of the discs, makes the plow adaptable for any type soil and any plowing conditions encountered.

Figures 15, 16 and 17 show the plow with a somewhat modified mounting arrangement. The parts of the plow corresponding to the parts already described are correspondingly numbered in these figures.

In Figures 15 and 16, it will be noted that plate 18 terminates at its forward edge in one or more journal parts 100 adapted for receiving the transversely extending pivot shaft 102, which has its ends received in the lower parts of a pair of vertical angles 104. The vertical angles 104 extend upwardly and overlie the adjustable axle part 106 of the tractor and are secured thereto by U-bolts, or by the bolts and plates indicated at 108.

Extending forwardly from the brace bar 50 is a short bar 110 that has a pivot means 112 extending into pivotal engagement with a U-shaped bracket 114. Bracket 114 is adapted for slidably receiving lift rod 116 that has a set collar 118 below bracket 114 and a set collar 120 above bracket 114, and a compression spring 122 between collar 120 and the said bracket.

Rod 116 engages bar 124 mounted on the outturned end of rock shaft 126, which, in turn, is connected to lever 128 which can be availed of for adjusting the said shaft about its axis, thus modifying the elevation of the plowing discs.

The plow shown in Figures 15 and 16 is the same as that already described and is characterized by the features already mentioned, including the coulter wheel that regulates the depth to which the plowing discs extend into the ground, and also absorbs side thrusts on the plow to prevent lateral drifting thereof.

In all cases, the plowing discs and coulter wheel are mounted on antifriction bearings and this is of particular benefit in reducing the draft required to generate the plow and in promoting free rotation of the discs whereby they are highly efficient in turning the ground over as plowing proceeds.

It will be understood that this invention is susceptible to modification in order to adapt it to different usages and conditions, and, accordingly, it is desired to comprehend such modifications within this invention as may fall within the scope of the appended claims.

I claim:

1. In a tractor having a plow located at one side thereof said plow comprising a plurality of discs, said tractor having a forward axle, means for mounting said plow on said forward axle comprising a plurality of beams substantially parallel to the longitudinal axis of said tractor, said discs secured to the rearward ends of said beams, a bracket member rigidly connecting said beams adjacent to the rearward ends thereof, vertical bracket means affixed to said forward axle, and a horizontal transverse pivot axis on said bracket means, a horizontal flat plate pivotally mounted on said axis, the forward ends of said beams rigidly secured on said plate, and means on said tractor connected to said beams for raising and lowering said plow.

2. In combination a disc plow and a tractor, said plow located at one side of the tractor and comprising a plurality of discs, a forward axle on said tractor, a connection between said plow and said forward axle supporting the plow for pivotal movement in a vertical plane comprising a plurality of beams extending forwardly from said discs parallel to the longitudinal axis of said tractor and lying in a plane above said discs, a bracket member rigidly connecting said beams adjacent to rearward ends thereof, a horizontal flat plate rigidly connecting the forward ends of said beams, a pair of brackets extending upwardly from said forward axle, a horizontal transverse pivot axis supported by said brackets, said flat plate being pivotally mounted on said transverse axis, and means on said tractor connected with said beams for varying its plowing action.

3. In combination a disc plow and a tractor, said plow located at one side of the tractor and comprising a plurality of discs, a forward axle on said tractor, a connection between said plow and said forward axle, said connecting comprising a plurality of beams supporting said discs and extending forwardly from said discs parallel to the longitudinal axis of said tractor, a transverse bracket member rigidly connecting said beams adjacent to the rearward ends thereof, a horizontal flat plate rigidly connecting the forward ends of said beams, means forming a horizontal pivot axis at the forward edge of said plate, a pair of suspension brackets depending from said axle and connected to said plate on said axis, and means on said tractor connected with said beams for raising and lowering said plow.

References Cited in the file of this patent

UNITED STATES PATENTS

| Number | Name | Date |
|---|---|---|
| 682,587 | Davis | Sept. 10, 1901 |
| 1,176,581 | McKay | Mar. 21, 1916 |
| 1,394,904 | Isgrig | Oct. 25, 1921 |
| 1,405,033 | Heylman | Jan. 31, 1922 |
| 1,456,817 | Morton | May 29, 1923 |
| 1,477,022 | Wood | Dec. 11, 1923 |
| 1,556,173 | Stephenson | Oct. 6, 1925 |
| 1,569,705 | Buescher et al. | Jan. 12, 1926 |
| 1,584,616 | Cathran | May 11, 1926 |
| 1,614,674 | Hester | Jan. 18, 1927 |
| 1,618,084 | Herzik | Feb. 15, 1927 |
| 1,719,743 | Altgelt et al. | July 2, 1929 |
| 1,729,639 | Altgelt | Oct. 1, 1929 |
| 1,791,201 | Grawunder | Feb. 3, 1931 |
| 1,801,277 | Kelley | Apr. 21, 1931 |
| 1,846,652 | Paul | Feb. 23, 1932 |
| 2,390,767 | Alderman | Dec. 11, 1945 |
| 2,453,197 | Clay | Nov. 9, 1948 |
| 2,456,465 | Strandlund | Dec. 14, 1948 |
| 2,467,111 | Coon | Apr. 12, 1949 |
| 2,528,352 | Faucett | Oct. 31, 1950 |

FOREIGN PATENTS

| Number | Country | Date |
|---|---|---|
| 14,283/28 | Australia | Aug. 7, 1929 |
| 24,947/35 | Australia | June 11, 1936 |